(12) United States Patent
Ahn et al.

(10) Patent No.: US 6,344,143 B1
(45) Date of Patent: Feb. 5, 2002

(54) PROCESS FOR WASTEWATER TREATMENT USING INTERMITTENTLY DECANTED EXTENDED AERATION PROCESS

(75) Inventors: Kyu Hong Ahn; Ick Tae Yeom; Hyung Jib Lee; Suh Hyung Lee; Kil Jae Lee, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/424,241

(22) PCT Filed: May 28, 1998

(86) PCT No.: PCT/KR98/00131

§ 371 Date: Feb. 15, 2000

§ 102(e) Date: Feb. 15, 2000

(87) PCT Pub. No.: WO98/54100

PCT Pub. Date: Dec. 3, 1998

(30) Foreign Application Priority Data

May 31, 1997 (KR) ............................................. 97-22491
Jan. 16, 1998 (KR) ............................................. 98-1208

(51) Int. Cl.[7] .............................. C02F 3/02; C02F 9/00
(52) U.S. Cl. ....................................... 210/620; 210/631
(58) Field of Search ................................ 210/620, 610, 210/631

(56) References Cited

U.S. PATENT DOCUMENTS 5,228,996 A * 7/1993 Lansdell
5,853,589 A * 12/1998 Desjardins

FOREIGN PATENT DOCUMENTS

| EP | 0 260 187 | 3/1988 |
| WO | WO 97/00832 | 1/1997 |

OTHER PUBLICATIONS

Patent Abstract of Japan, vol. 14, No. 466 (C–768), 1990, JP 02–0191597, Jul. 27, 1990.

* cited by examiner

Primary Examiner—Chester T. Barry
(74) Attorney, Agent, or Firm—Oblon, Spivak, McClelland, Maier & Neustadt, P.C.

(57) ABSTRACT

An Intermittently Decanted Extended Aeration (IDEA) process characterized in that an aeration period, a settling period and a decanting period are successively repeated in that order in a single reactor, and influent wastewater is transversely supplied at the bottom of the reactor and slowly diffused in the reactor while treated wastewater wich is intermittently discharged during the decanting period is provided. According to the process of the invention, wastewater can be efficiently treated without by-pass of wastewater under dry weather and wet weather conditions as well as stormy weather condition.

17 Claims, 2 Drawing Sheets

PROCESS FOR WASTEWATER TREATMENT USING INTERMITTENTLY DECANTED EXTENDED AERATION PROCESS

BACKGROUND OF THE INVENTION

1. Field of the Invention

The present invention relates to a process for wastewater treatment in order to remove nitrogen and phosphorus as well as organic substances in wastewater. More particularly, the present invention relates to a process for wastewater treatment using an Intermittently Decanted Extended Aeration (IDEA) procedure comprising a cycle procedure wherein three periods of aeration, settling and decanting are successively repeated in that order in a single reactor.

2. Description of the Prior Art

In the past, wastewater treatment plants usually aimed at the removal of organic substances and suspended solids in wastewater. Accordingly, in conventional wastewater treatment, many inorganic nutrients such as nitrogen and phosphorus were not removed and discharged into lakes and marshes. This resulted in eutrophication of lakes and marshes, which makes it difficult to provide clean water resources and preserve the ecological system. For example, in wastewater treatment plants, the removal rate of organic substances is 80% or more, but nitrogen and phosphorus are not efficiently removed and discharged together with wastewater. Such wastewater containing nitrogen and phosphorus which is discharged into lakes and marshes induces excessive proliferation of algae, which makes it difficult to provide high-quality water resources. As a result, the costs for wastewater treatment are dramatically increased and an advanced treatment for purifying wastewater is further required.

Accordingly, several processes for removal of various nutrients present in wastewater are proposed in the art. They may be roughly categorized into a process for removal of nitrogen, a process for removal of phosphorus and a process for simultaneous removal of nitrogen and phosphorus.

A conventional process for wastewater treatment uses a cycle process of nitrification and denitrification by microorganism for removal of nitrogen, and the principle of anaerobic-aerobic process which is carried out through aerobic luxury uptake of phosphorus released under anaerobic and anoxic condition by microorganism for removal of phosphorus.

For example, there are Bardenpo's process being referred as a process for simultaneous removal of nitrogen and phosphorus, and anaerobic-aerobic process (A/O process) and $A_2/O$ process being referred as a process for biological removal of phosphorus. Additionally, there is a process for the treatment of wastewater such as a chemical precipitation which uses a general coagulant such as aluminum and lime, and ammonia-stripping process.

However, each of the conventional processes as mentioned above has defects in accordance with its operative characteristics. Such defects are summarized in Table 1.

TABLE 1

| Process | Defects |
| --- | --- |
| $A_2O$ | unstable operation in cold climates |
| | complexity compared to A/O |
| Bardenpo's Process | Many internal circulations are required. |
| | (Costs of pump's energy and maintenance are increased) |

TABLE 1-continued

| Process | Defects |
| --- | --- |
| | Necessity for feeding of chemicals is uncertain. |
| | Larger volume of reactor is required compared to $A_2O$. |
| | Removal efficiency of nitrogen and phosphorus is reduced because of primary sediments. |
| | High BOD/P ratio is required. |
| | Effects of temperature on performance of process are unknown. |
| UCT | Many internal circulations are required. |
| | (Costs of pump's energy and maintenance are increased) |
| | Necessity for feeding of chemicals is uncertain. |
| | Effects of temperature on performance of process are unknown. |
| VIP | Many internal circulations are required. |
| | (Costs of pump's energy and maintenance are increased) |
| | Efficiency for removal of nitrogen is reduced in low temperatures. |

As a result of an extensive investigation in order to eliminate defects of conventional processes described in the above Table 1, and to develop the process for removal of nitrogen and phosphorus as well as organic substances with high degree of efficiency, the present inventors accomplished the present invention.

SUMMARY OF THE INVENTION

It is therefore an object of the present invention to provide a process for wastewater treatment using an Intermittently Decanted Extended Aeration (IDEA) procedure characterized in that three periods of aeration, settling and decanting are successively repeated in that order in a single reactor, wherein the influent wastewater is transversely supplied in bottom of the reactor and slowly diffused in the reactor for the entire period of the procedure while the treated wastewater is intermittently discharged only during decanting period.

It is another object of the present invention to provide a process for wastewater treatment using the IDEA procedure wherein three periods of aeration, settling and decanting are successively repeated in that order in a single reactor, characterized in that said aeration period comprises a first phase which is carried out by small amounts of oxygen with feeding outside carbon source and a second phase which is carried out by large amounts of oxygen according to the control of the amount of oxygen to be fed in the aeration period.

Further objects and advantages of the invention will become apparent through reading the remainder of the specification.

DETAILED DESCRIPTION OF THE INVENTION

Figure 1:
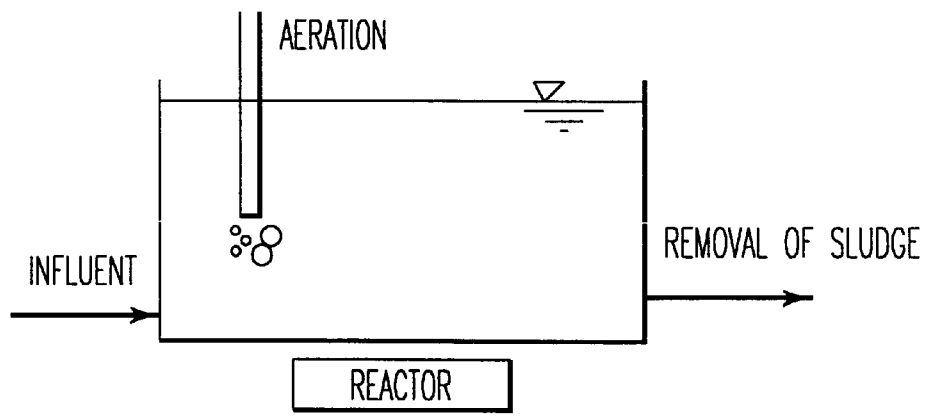
FIG. 1 is a diagram showing an aeration period.

Contrary to the conventional continuous steady-state biological procedure wherein two treatment procedures of biological oxidation and separation of suspended solids are sequentially carried out in separate reactors, the process of the invention includes an Intermittently Decanted Extended Aeration (IDEA) procedure including a cycle procedure consisting of three periods of aeration, settling and decanting wherein two treatment procedures of biological oxidation and separation of suspended solids are alternately carried out in a single reactor at some intervals of times.

According to the process of the invention, influent wastewater is supplied transversely and slowly diffused at the bottom of the reactor for the entire period of the procedure and the treated wastewater is intermittently discharged. Thus, the process according to the invention is different from the sequential batch process or fill-and-draw process wherein at influx of wastewater is intermittently regulated and a cycle of the treatment procedures comprises four periods of filling, aeration, settlement and draw.

According to another embodiment of the invention, a cycle procedure for wastewater treatment is provided which comprises three periods of aeration, settling and decanting being successively repeated in that order in a single reactor, wherein said aeration period comprises the first aeration phase which is carried out by small amounts of oxygen with supplying external carbon source together with wastewater and the second aeration phase which is carried out by large amounts of oxygen.

Generally, since carbon sources necessary to denitrify nitrate or nitrite into $N_2$ and to induce release of phosphorus in the anaerobic condition during the wastewater treatment procedures are insufficient in domestic wastewater, it is difficult to optimally carry out a cycle of nitrification and denitrification. Further, after the settling and decanting period, it is difficult to directly convert anaerobic condition of the reactor into aerobic condition when starting the aeration period, and thus a reaction in the reactor tends to be biased to nitrification or denitrification. Accordingly, a cycle procedure of nitrification-denitrification can be optimally carried out by controlling amounts of oxygen to be supplied during the aeration period to effect transient aeration period and then adding external carbon source to the reactor.

According to the preferred embodiment of the invention, the process comprising control of the supply of oxygen and addition of external carbon source is summarized in Table 2.

TABLE 2

| Period | | | Remarks |
|---|---|---|---|
| Aeration (45–90 min.) | The first phase (10–20 min.) | 30 to 50% oxygen amount of the second phase | If acceleration of denitrification is desired, an external carbon source may be added together with influent wastewater |
| | The second phase (25–80 min.) | 100% operation of oxygen supplying apparatus | Oxidation of organic substances; Nitrification; and Luxury uptake of phosphorus |
| | The sludge wasting phase | | Removal of sludge containing phosphorus |
| Settling (60–90 min.) | | | Accumulation of organic substances; and Release of phosphorus under anaerobic condition; if desired, to facilitate release of phosphorus, external carbon source may be added. |
| Decanting (20–45 min.) | | | |

The invention will be described in greater detail with reference to the accompanying drawings, according to each period of procedure.

(1) The aeration periods (See FIG. 1)

Generally, in this period, Chemical Oxygen Demand (COD) and Biochemical Oxygen Demand (BOD) is reduced through oxidation procedure of organic substances by a microorganism present in the reactor, and nitrification of free ammonia and luxury uptake of phosphorus, which are intermediate steps for removal of nitrogen and phosphorus, also occurs by utilizing supplied oxygen.

According to the preferred embodiment of the invention, the aeration period comprises the first and second aeration phases.

The first aeration phase occupies 10 to 40% of the whole aeration period. In this phase, an external carbon source available to induce effective denitrification is supplied together with wastewater, and 30 to 50% of oxygen to be supplied for the second phase described below is provided. In this phase, only 30 to 50% of the total oxygen supply system is operated. Since a settled layer of sludge is maintained in anaerobic state during the previous periods of settling and decanting, it takes more or less time to convert anaerobic states into aerobic states. Thus, during the first phase, since the internal states of the reactor are maintained in anaerobic state, denitrification can be more actively performed with the external carbon source to be supplied during such anaerobic states. Preferably, said external carbon source may be selected from a group consisting of methanol, ethanol, glucose, acetate and methane. A concentration of the carbon source is preferably about 100 to 200 mg/L as calculated in terms of COD.

In the second aeration phase, supply of external carbon source is interrupted, and the whole oxygen supplying apparatus comes into action. As a result, the internal state of the reactor is converted from an anoxic/anaerobic condition into aerobic condition. When the internal state of the reactor is converted into an aerobic condition, polyphosphate accumulating bacteria (PAB) take excess phosphorus as the forms of ortho-phosphate which are released under the anaerobic states in the settled sludge layer during the settling and decanting periods, and phosphorus is removed through sludge wasting.

Also, since the mixing of wastewater is sufficiently accomplished by supplying oxygen, nitrogen and phosphorus can be removed without additional stirring apparatus or stirring reactor, that is without anoxic/anaerobic stirring step. Accordingly, according to the invention, a more economical process for wastewater treatment can be provided.

In the aerobic condition of the second phase, COD and BOD are reduced through oxidation of organic substances by microorganisms using oxygen as supplied in the reactor, and $NH_3$—N is actively nitrified to provide $NO_2$—N and $NO_3$—N. The resulting nitrous acid and nitric acid can be removed by denitrification in subsequent settling and decanting periods, and in another first phase of aeration.

An aerator and a diffuser may be used to make a completely mixed homogeneous state in the reactor. If desired, additional stirring apparatus may be provided.

Further, as known in the prior art, chemical coagulants such as lime, alum, ferric chloride, ferrous chloride, ferric sulfate and ferrous sulfate are added to the reactor to give precipitates with phosphorus component present in the wastewater so that removal efficiency of phosphorus may be increased.

Sludge (reacted microorganism) wasting may be continued during the aeration period or carried out only for given short periods. Preferably, sludge wasting may be carried out for a short time (i.e. 1 to 5 min.) at the end of the second phase of aeration in which the sludge is an active state, and discarded sludge may be further treated with separate equipment for sludge concentration and dehydration.

Generally, the sludge wasting described above plays three major roles as follows. Firstly, since the sludge in the aeration period contains microorganisms taken luxurious phosphorus, phosphorus can be removed together with the sludge. Secondly, sludge wasting can regulate solid retention time (SRT) among operation design and control parameters of the present process. Thirdly, through regulation of amounts of sludge to be wasted, formation of aggregates of the active sludge in the reactor can be prevented.

The periods of first and second phase of aeration can be generally determined through the design of the present procedure, based on the nature of influent wastewater and condition of location, in particular the settling property of sludge in the reactor. Amounts of oxygen supplied can be determined so that a concentration of dissolved oxygen in water maintains up to 0.3–0.5 mg/L for the first phase, and 1.5–3.0 mg/L for the second phase of aeration.

Figure 2:
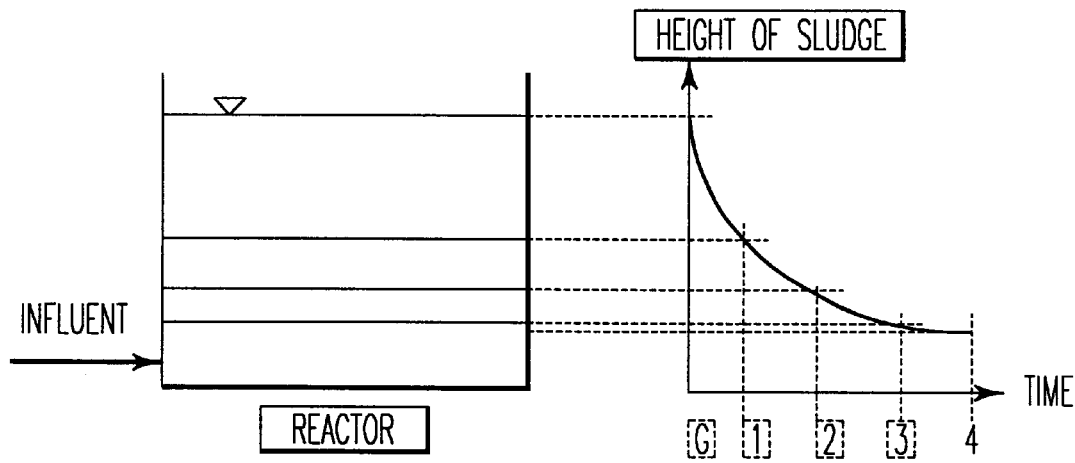
FIG. 2 is a diagram showing a settling period.

(2) The settling period (See FIG. 2)

The aeration is interrupted in the reactor with the initiation of the settling period. Active sludge starts to homogeneously settle; and then a concentration of dissolved oxygen is slowly dropped to convert aerobic condition to anaerobic condition in the reactor. As a result, denitrification by microorganism is carried out by using influent wastewater as organic carbon source and $NO_2$ and $NO_3$ formed in the aeration period as electron acceptor. Preferably, in this period, volatile fatty acids such as acetate, propionate, and valerate are added as a carbon source to the wastewater to be entered into sludge layer with the proceeding of settling period to facilitate the release of phosphorus from the PAB microorganism by the effect of very volatile fatty acids. A concentration of carbon source to be added may be between about 150 to 300 mg/L as calculated in terms of COD. Preferably, volatile carbon sources are added together with influent wastewater in the late settling period and decanting period to maximise such release of phosphorus from microorganism.

The object of the settling period is the denitrification and release of phosphorus in the sludge layer as well as forming a clear supernatant above the settled layer and making it easy to discharge treated wastewater during the subsequent decanting periods.

Figure 3:
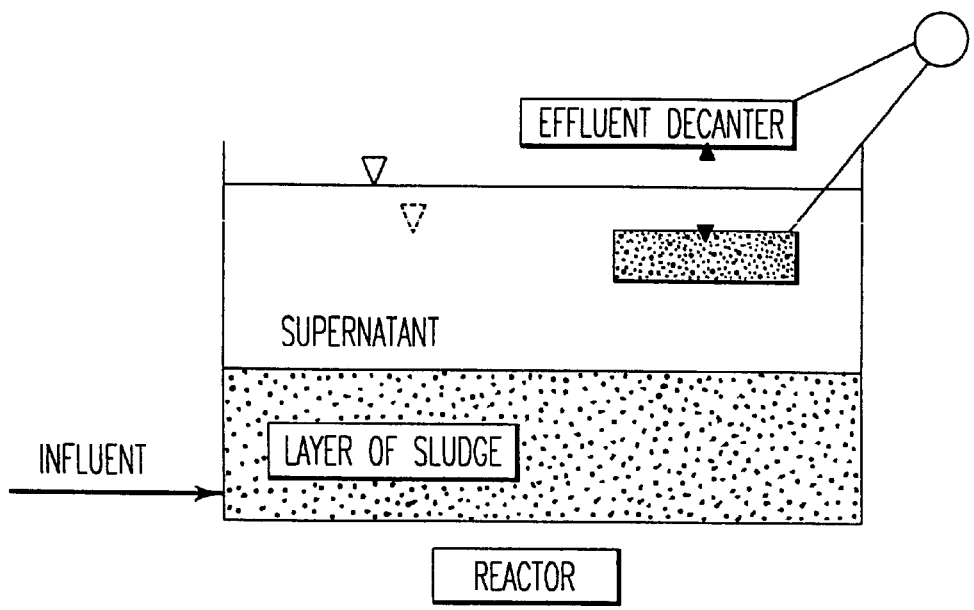
FIG. 3 is a diagram showing a decanting period.

(3) The decanting period (See FIG. 3)

Upon completion of the settling period, a clear supernatant water is formed. The decanting of the above treated, clear wastewater may be carried out by means of effluent decanter which is designed to remove residues and scum suspended in wastewater. Typically, the decanting period begins with dropping of effluent decanter below the water surface. Then, the supernatant water flows in the decanter and the decanter is dropped with suitable velocity and height in order to discharge a given calculated amount of treated wastewater.

The effluent decanter continues to drop until this period is completed. The height of the water surface return to the water level before the aeration period when the decanting period is completed, and then another aeration period again goes on.

Meanwhile, since an influx of wastewater and the addition of external carbon source continues during this decanting period, microorganisms in the settled layer of sludge can maintain their activity, and the settled layer of sludge can play a role of a blocking curtain to prevent treated wastewater from contamination due to release of phosphorus by microorganism and influent wastewater.

Figure 4:
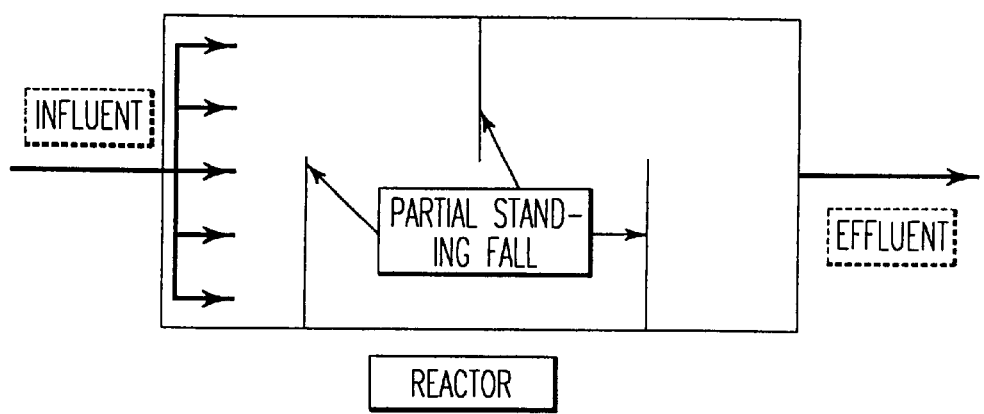
FIG. 4 is a plane figure of reactor according to the present invention.

Further, partial standing walls may be provided within the reactor of the invention so that wastewater may slowly flow and diffuse into the reactor as shown in FIG. 4.

Meanwhile, during the three periods as described above, the top water level (TWL) and bottom water level (BWL) are very critical parameters to design and to control the process of the invention. These parameters may be determined in the course of procedure design. Also, the length of each period and the shape, size, structure of the reactor may be determined in the course of design according to the nature of influent wastewater, condition of location of wastewater treatment plant, etc.

Further, according to the invention, the process which is provided can be normally operated only be altering each period length of the procedure without by-pass of wastewater even under stormy weather as well as in dry weather and wet weather periods. The operation of the process under certain climate conditions is further described in detail below.

1) Operation under dry weather flow

In this operation cycle, three essential periods of aeration, settling and decanting should be determined so as to obtain good effluent water. During the cycle of the process, the period of aeration should be determined based on the total aeration period to supply the amount of oxygen required per day so as to satisfy amounts of oxygen required in the procedure. The times of the settling period and decanting period should be determined so that the sludge can be settled in a suitable depth to discharge a clear effluent without leakage of sludge.

2) Operation under wet weather flow and storm flow

Since this procedure is operated by intermittently decanting wastewater, the level of water continues to go up during the entire period except during the decanting period. If the water level rises excessively during the aeration period under wet weather flow and storm flow, wastewater in the reactor will overflow so that a part of suspended solids may be flowed out. However, according to the process of the invention, the period of process cycle can be shortened so that this phenomenon may not occur. Accordingly, this procedure can cope with wet weather and storm flow only by controlling the periods of the procedure cycle without change of other factors. Thus, by-pass of influent wastewater is not necessary.

Preferably, an electronic water level sensing system may be used in the process of the invention in order to determine suitable period of the cycle. That is, when level of wastewater rises over a specific water level, programmed settling and decanting periods will be come into action through operation of a storm switch detector. In such a case, it is preferable to maintain the settling period to other 60 min. in order to prevent sludge from flowing out together with effluent water.

PREFERRED EMBODIMENT OF THE INVENTION

The present invention will be described in greater detail by way of the following examples, which are not intended to limit the invention.

Example 1

An actual wastewater obtained from the KIST residents' apartment (Seoul, Korea) was used for the experiment. The properties of the wastewater as used are described in the following Table 3. Particularly, this wastewater contains low concentration of carbon source as shown in Table 3.

A reactor having 17 L of maximal working volume with circular bottom having diameter of 20 cm was seeded with a grab sample obtained from aerobic basin of the Kwangdongli Sewage Treatment Plant (Kwanju-Goon, Kyungi-Do, Korea), and then said wastewater was fed thereto. Cyclic operation of the reactor was controlled by a Master-K30H programmable logic controller (PLC, LG Electronics, Korea).

10 L of influent wastewater was fed to the reactor everyday and aeration period was set at 48 min., settling period at 72 min., and decanting period at 24 min, respectively; the duration of each cycle was 144 min (2.4 hr) i.e. 10 cycles per day.

To control the sludge retention time, active sludge was washed during the last minutes of the aeration period in accordance with the desired SRT. In the aeration periods, air was supplied to the reactor by aquarium-type diffuser stone. The supply rate was controlled using Dwyer flowmeter. The amount of air supplied was generally in the range of 0.1–1.0 L/min.

Effluent wastewater samples were collected from the entire decanted effluent at the same cycle in two to four times a week and analyzed. Samples for the determination of soluble components were filtered through 0.45 μm filter paper immediately after sampling and cooled into 4° C. in order to prevent further contamination. All sample analyses were performed according to the Standard Methods (APHA, 1992).

The results of wastewater treatment are set forth in Table 3.

Example 2

The same reactor as in Example 1 was used in this example. The operation conditions were exactly the same as in Example 1, except that 48 min. of aeration period was divided into the 15 min. of first aeration phase (FAP), and the subsequent 33 min of the second aeration phase (SAP), and methanol was added during FAP and acetate ws added to the reactor during the last 24 min. of the settling period and the whole decanting period.

The amount of methanol added was 200 mg/L and that of acetate ws 300 mg/L as calculated in terms of COD based on the total wastewater.

The results of wastewater treatment are set forth in Table 3.

TABLE 3

| | | Example 1 | | Example 2 | |
|---|---|---|---|---|---|
| Item | Influent wastewater | Effluent Conc. (mg/L) | Efficiency (%) | Effluent Conc. (mg/L) | Efficiency (%) |
| COD | 75.8 | 17.3 | 77.2 | 19.5 | 74.3 |
| BOD | 48.5 | 12.3 | 74.6 | 14.2 | 70.7 |
| SS* | 67.2 | 11.9 | 82.3 | 12.3 | 81.7 |
| T-N** | 73.1 | 51.2 | 30.0 | 11.2 | 84.7 |
| $NH_3$/$NH_4^+$ | 62.8 | 31.2 | | 5.65 | |
| $NO_2^-$ | 0.59 | 0.23 | | 0.35 | |
| $NO_3^-$ | 2.31 | 16.8 | | 4.70 | |
| T-P*** | 7.03 | 6.22 | 11.5 | 1.91 | 72.8 |
| $PO_4^{3+}$ | 5.88 | 5.75 | | 1.72 | |

*Suspended Solid
**Total Nitrogen
***Total Phosphorus

As shown in the above results, in the treatment of domestic wastewater not having sufficient carbon source, total nitrogen and total phosphorus removed much more efficiently in Example 2 than in Example 1.

What is claimed is:

1. A process for wastewater treatment comprising a cycle procedure wherein a aeration period, a settling period and a decanting period are successively repeated in that order in a single reactor and influent wastewater is transversely supplied at a bottom of the reactor and slowly diffused in the reactor for the whole time of the process while the treated wastewater is intermittently discharged only during the decanting period.

2. The process of according to claim 1, wherein the aeration period comprises
  a) a first aeration phase being carried out by oxygen being supplied so as to maintain a dissolved oxygen concentration of 0.3–0.5 mg/L, and
  b) a second aeration phase being carried out by oxygen being supplied so as to maintain a dissolved oxygen concentration of 1.5–3.0 mg/L.

3. The process according to claim 1 or 2, wherein biological oxidation of wastewater and aerobic stabilization of sludge are simultaneously performed within said reactor.

4. The process according to claim 1 or 2, wherein by altering times of each period of aeration, settling and decanting, the process is used without by-pass of influent wastewater under dry weather, wet weather or stormy weather conditions.

5. The process according to claim 1 or 2, wherein said decanting period is carried out by means of an effluent decanter provided with equipment for removing residues and scum suspended in wastewater.

6. The process according to claim 1 or 2, wherein chemical coagulant(s) selected from the group consisting of lime, alum, ferric chloride, ferrous chloride, ferric sulfate and ferrous sulfate is added to the reactor during the aeration period.

7. The process according to claim 2, wherein sludge is discarded during said second aeration phase, by which nitrogen and phosphorus are removed.

8. The process according to claim 2, wherein an external carbon source selected from the group consisting of methanol, ethanol, glucose, acetate and methane is supplied to said reactor together with influent wastewater during said first aeration phase.

9. The process according to claim 8, wherein the amount of said external carbon source is about 100 to 200 mg/l, as calculated in terms of chemical oxygen demand.

10. The process according to claim 2, wherein a volatile fatty acid selected from the group consisting of acetate, propionate; and valerate is supplied to said reactor during said settling periods.

11. The process according to claim 10, wherein the amount of said volatile fatty acid is about 150 to 300 mg/L, as calculated in terms of chemical oxygen demand.

12. The process according to claim 10, wherein said volatile fatty acid is supplied to said reactor together with wastewater during the latter part of said settling period and said decanting period.

13. The process according to claim 1, wherein said aeration period is from 45–90 minutes and comprises a first aeration phase lasting from 10–20 minutes; a second aeration phase lasting from 25–80 minutes; and wherein said first aeration phase has an amount of oxygen which is 30 to 50% of the amount of oxygen used in second phase.

14. The process according to claim 1, wherein said settling period lasts from 60–90 minutes.

15. The process according to claim 1, wherein said decanting period lasts from 20–45 minutes.

16. The process according to claim 1, wherein sludge is discarded during said second aeration phase, by which nitrogen and phosphorus are removed.

17. The process according to claim 1, wherein the reactor comprises partial standing walls.

* * * * *

UNITED STATES PATENT AND TRADEMARK OFFICE
CERTIFICATE OF CORRECTION

PATENT NO.    : 6,344,143 B1
DATED         : February 5, 2002
INVENTOR(S)   : Ahn et al.

It is certified that error appears in the above-identified patent and that said Letters Patent is hereby corrected as shown below:

<u>Title page,</u>
Item [86], the PCT information should read:

[86]   PCT No.:        PCT/KR98/00131
       § 371 Date:     Dec. 8, 1999
       § 102(e) Date:  Dec. 8, 1999

Signed and Sealed this

Eighteenth Day of June, 2002

Attest:

Attesting Officer

JAMES E. ROGAN
*Director of the United States Patent and Trademark Office*